United States Patent
Toshimoto et al.

[11] Patent Number: 6,144,389
[45] Date of Patent: Nov. 7, 2000

[54] INTELLIGENT TERMINAL DEVICE HAVING CAPABILITY OF DISPLAYING TRANSMITTED DATA

[75] Inventors: Michitaka Toshimoto, Yamatokooriyama; Takefumi Sato, Higashihiroshima, both of Japan

[73] Assignee: Sharp Kabushiki Kaisha, Osaka, Japan

[21] Appl. No.: 09/069,840

[22] Filed: Apr. 30, 1998

[30] Foreign Application Priority Data

Jun. 2, 1997 [JP] Japan .................................. 9-144029

[51] Int. Cl.⁷ .................................................. G06T 11/00
[52] U.S. Cl. ..................... 345/472; 345/471; 345/127; 345/128; 345/129; 345/130; 345/428; 340/825.44; 340/825.47; 707/508; 707/529; 707/542
[58] Field of Search ..................... 345/471, 127, 345/128, 129, 130, 132, 472, 428; 340/825.44, 825.47; 707/508, 529, 542

[56] References Cited

U.S. PATENT DOCUMENTS

| | | | |
|---|---|---|---|
| 4,896,147 | 1/1990 | Futakata | 345/129 |
| 5,212,477 | 5/1993 | Indekeu et al. | |
| 5,499,020 | 3/1996 | Motohashi et al. | 340/825.44 |
| 5,920,271 | 7/1999 | Hwang | 340/825.44 |

FOREIGN PATENT DOCUMENTS

| | | |
|---|---|---|
| 0585118A1 | 3/1994 | European Pat. Off. |
| 3-196216 | 8/1991 | Japan |
| 8-79364 | 3/1996 | Japan |

OTHER PUBLICATIONS

Patent Abstracts of Japan, vol. 096, No. 007, re: JP Publication No. 08079364 dated Mar. 22, 1996, abstract.

Kuznicki W.J.: "Visual Persuasion Display Pager", Motorola Technical Developments, vol. 13, Jul. 1, 1991, pp. 116–117.

*Primary Examiner*—Mark Zimmerman
*Assistant Examiner*—Kimbinh T. Nguyen

[57] ABSTRACT

An intelligent terminal device capable of displaying message information to be transmitted/received by using a font having a predetermined size depending upon the amount of the information and of changing fonts having different sizes in response to a command. A message is received by a receiving unit, demodulating unit and data detecting unit, and is stored in a register unit after being passed through a CPU. The amount of information is measured in a character number count unit, where a reference data corresponding to the amount of the information is fed to a display control unit by a comparator. The display control unit selects font from a font storing unit in accordance with the reference data and causes the display unit to display the message stored in the register unit in the selected font. Fonts used for display may be intentionally changed by a user actuating up and down keys of the key pad.

22 Claims, 3 Drawing Sheets

FIG. 3A

Please
Call me
at 10PM.

FIG. 3B

TQ-PX intelligent graphical display can modify the character font to utilize the display area maximally depending on the length of each message.

FIG. 3C

Mike Says,
Please give me a call at
201 934 6217
Thank you.

FIG. 3D

If you call me at
10 : 15pm, Please
call at
201 934 6217

→ AFTER EDITION →

10 : 15
201 934 6217

INTELLIGENT TERMINAL DEVICE HAVING CAPABILITY OF DISPLAYING TRANSMITTED DATA

BACKGROUND OF THE INVENTION

Recently, portable intelligent terminal devices have become popular and more compact in size and the contents of messages and data to be transmitted/received have been complicated. In association with this, efforts have been made to enhance the visibility of displayed information and to reduce or eliminate erroneous recognition of the displayed content by various modifications of the display.

For example, in some communication terminal devices, the display is adapted to display a plurality of operation items and a cursor indicating which one of the items is currently selected. On some of the displays, characters and numerals with a plurality of display sizes are displayed.

Pixels are arrayed in columns and rows in a matrix manner on the screen of a liquid crystal display. Information can be displayed on the screen by two fonts. One of the fonts is a smaller font consisting of a smaller number of dots while the other font consists of a larger number of fonts. Therefore, a larger number of characters can be displayed by using smaller font while a smaller number of character can be displayed by using larger dots.

The larger font is principally used to indicate the characters which are entered by users while smaller font is generally used for displaying messages from the device. However, if the number of characters which are entered by user exceeds a predetermined number (for example, 20), the fonts could be changed from a larger size to a smaller size.

For example, messages from the device are displayed on an upper row by means of smaller font. If the number of characters which are entered by users is less than 10, the characters are successively displayed on a next lower row adjacent to the upper row by using larger font. If the number of entered characters exceeds 10, however the preceding message of initial 10 characters of larger font on the next upper row would be replaced with the message which is displayed by using smaller font and eleventh and subsequent characters would be displayed by means of larger font on a third row. If the total number of the entered characters reaches 20 and/or exceeds it, all entered characters would be displayed with the smaller font.

Such a front changing capability enables larger characters to be entered by confirming them while the number of entered characters is less. This makes it possible to reduce an erroneous entry such as mistyping, for example.

A concept to change the sizes of fonts has been adopted in word processors systems such as word processor and computers which are capable of processing documents. It is tedious to fill a table blank that is encircled by lines with characters, especially when the width of the blank is fixed and the number of the characters are optional, since the font size of the characters to be entered should be determined. Accordingly, the number of characters to be entered was calculated by adding the number of the already characters with that of the characters which will be entered. The result was fed to a font size calculating unit in which the maximum font size of the characters which will be accommodated of the row in interest is automatically calculated from the row size and the calculated number of characters. Characters having a calculated font size were then displayed on the display.

In other words, in the prior art device, information to be displayed was limited to messages which are entered by users the fonts were changed by the calculation of the number of characters to be entered, so that as many characters can be displayed as many. Therefore, only changing from larger font to smaller font was permitted. Moreover it took a long period of time to change characters to be entered to that of the already entered characters.

SUMMARY OF THE INVENTION

The present invention relates to an intelligent terminal device having a capability of displaying transmitted information and in particular to an potable intelligent terminal devices such as cellular phones, pagers, answering phones, PDA (personal Digital Assistants)/PIT for transmitting/receiving data and/or massages via a wired or wireless analog or digital line. The intelligent terminal device having a capability of displaying transmitted information in which messages to be transmitted or received are displayed by fonts such as characters and numerals, the size of which is selected either depending upon the amount of the information of the messages, or by intentional selection selected either by user.

Conventional intelligent terminal devices have developed no concept to enhance the visibility of information displayed on a display screen and to prevent error recognition by displaying messages and the like by using a font having a size which is best matched with said screen size depending upon the amount of messages and data to be transmitted/received. If the amount of message is low for a device having a large display area, there is a problem that only small characters will be displayed.

Since message to be transmitted/received cannot be displayed on the screen by using a font having a size which the user likes in the prior art device, there are problems that confirmation cannot be readily performed and that there is the risk that erroneous messages may be transmitted.

Additionally, there has been no effort to reflect on the display result of recognition of the consecutive alphanumeric characters which are contained in the message as important information and the like to be transmitted/received in the prior art intelligent terminal device. There has been a problem that only the consecutive alphanumeric characters which were recognized as important information can not be especially confirmed. There has also been a problem that there is the risk of erroneous transmission of the consecutive alphanumeric characters.

Since edition and display of only consecutive alphanumeric characters is not conducted in the prior art intelligent terminal device, there is a problem that special attention should be paid for confirmation of the consecutive numerals.

The present invention was made in view of the above-mentioned problems. It is an object of the present invention to provide an intelligent terminal device which is capable of displaying messages to be transmitted/received with optimal she font which is determined depending upon the amount and the importance of the information of the messages and of displaying transmitted information without any risk of erroneous transmission of messages.

One (1) object of the invention to provide an intelligent terminal device having a capability of displaying transmitted data, including means for transmitting/receiving transmitted signals, means for entering information such as messages and/or commands, means for displaying information which is carried by the transmitted signals transmitted/received by said transmitting/receiving means and information such as the message and/or commands entered by said entering means, means for measuring the amount of the information carried by the transmitted signals transmitted/received by said transmitting/receiving means and of the information entered by said entering means as the number of characters and symbols, and means for storing fonts having different sizes, the said intelligent terminal device further comprises comparing means for holding, as reference data, data on the size of the font which is selected with respect to the amount of information represented by symbols and/or characters, whereby the number of symbols and/or characters which is obtained by measuring the amount of the information to be displayed on said display unit is compared with said reference data by said comparing means, font size data being selected by the result of the comparison, the font having a size which is specified from said font storing means by specifying the selected front size data being selected so that the symbols and/or characters are displayed on said display means by using the selected font. Thereby the transmitted information can be displayed on a display screen by using a front having a size which is best matched with the size of the screen.

It is another object (2) of the invention to provide an intelligent terminal device having a capability of displaying transmitted data defined in the above item (1), wherein the data on font size which specifies the font sizes of the information to be displayed on said display unit are changed in response to a command which is input from said entering means, the font having the size which is specified by new data on the changed font size being used for displaying on said displaying means. Thereby the transmitted information can be displayed on a display screen by using a font having a size which the user likes size best.

It is another (3) object of the invention to provide an intelligent terminal device having a capability of displaying transmitted data defined in the above item (1) or (2), wherein said device further comprises means for detecting characteristic information which is specified by consecutive numerals and the like including symbols which are contained in information carried by a transmitted data transmitted/received by said transmitting/receiving means and information input by said entering means, fonts representative of said characteristic information being stored in said font storing means as special fonts, special font being selected from those in said font storing means in accordance with the result of detection by said detecting means so that it is used for displaying by said display means. Thereby a display of numeral and symbols being contained in transmitted massage may have high visibility.

It is another object of the invention to provide an intelligent terminal device having a capability of displaying transmitted data defined in either above item (1) or (2), wherein said device further comprises means for detecting characteristic information which is specified by consecutive numerals and the like including symbols which are contained in information carried by a transmitted data transmitted/received by said transmitting/receiving means and information input by said entering means. Specically and in that only characteristic information which is detected by said detecting means from the information carried by transmitted signal transmitted/received by said transmitting/receiving means, and the information entered by said means is displayed in response to a command entered from said entering means. Thereby a display of numeral and symbols as important information being contained in transmitted message may have high visibility.

BRIEF DESCRIPTION OF DRAWINGS

FIG. 3A to FIG. 3D are views for illustrating different display conditions on the display screen of the intelligent terminal device of the present invention.

PREFERRED EMBODIMENTS OF THE INVENTION

Figure 1:
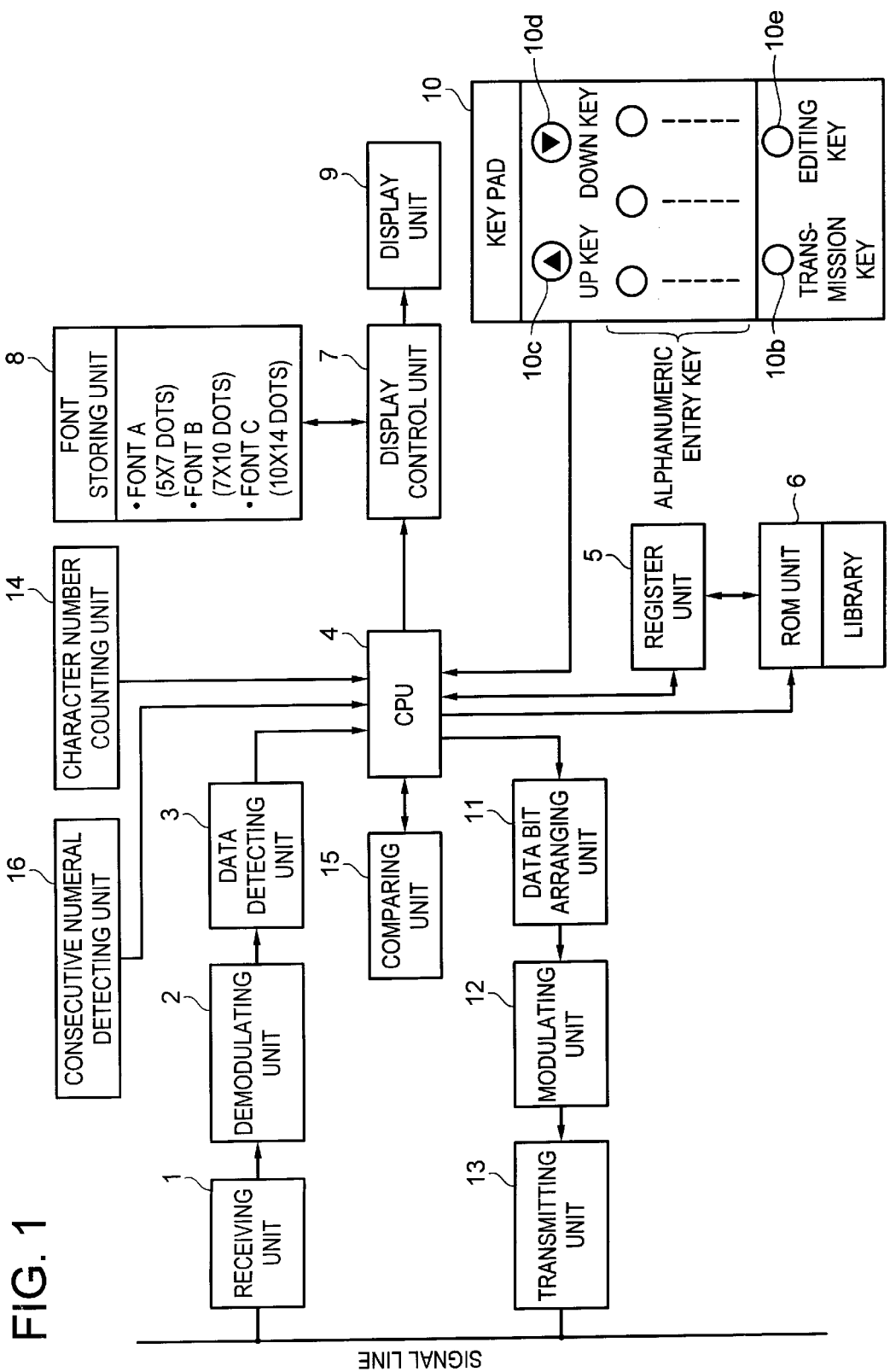
FIG. 1 is a block diagram showing the configuration of an embodiment of the intelligent terminal device of the present invention.

FIG. 1 is a block diagram showing the configuration of an embodiment of an intelligent terminal device. In this embodiment, information such as message and/or data (hereinafter referred to as message and the like) to be transmitted/received is displayed on a screen by using a font having a size which is automatically optimally matched to the size of the screen depending upon the amount of information.

In FIG. 1, a transmitted signal carrying information such as message and the like, which is input to a signal line and received by a receiving unit 1 is demodulated into a baseband signal by a demodulating unit 2 and is recovered to a digital signal representing specific characters or numerals by a data detecting unit 3.

A CPU 4 causes a register unit 5 to compare the digital signal with a content stored in a library data base of a ROM unit 6 to determine whether it matches with it and to determine which character or numeral the digital signal represents. At this time, the number of characters including numerals is counted by a character number count unit 14 and simultaneously its count is input to a comparing unit 15 in which it is compared with the data stored therein and the result of the comparison is fed to the CPU 4.

Figure 2B:
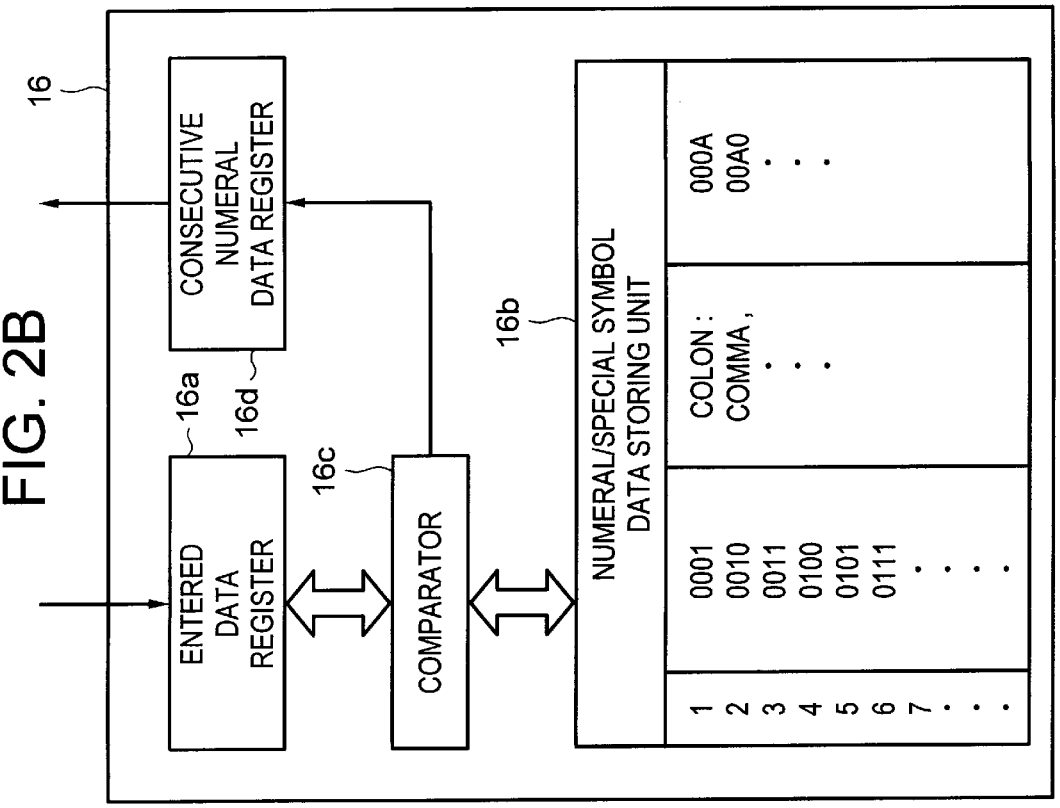
FIG. 2A and FIG.2B are block diagrams showing in detail a comparing unit (FIG. 2A) and consecutive numeral detecting unit (FIG. 2B) in the configuration of the embodiment of the intelligent terminal device of the present invention shown in FIG. 1.
Figure 2A:
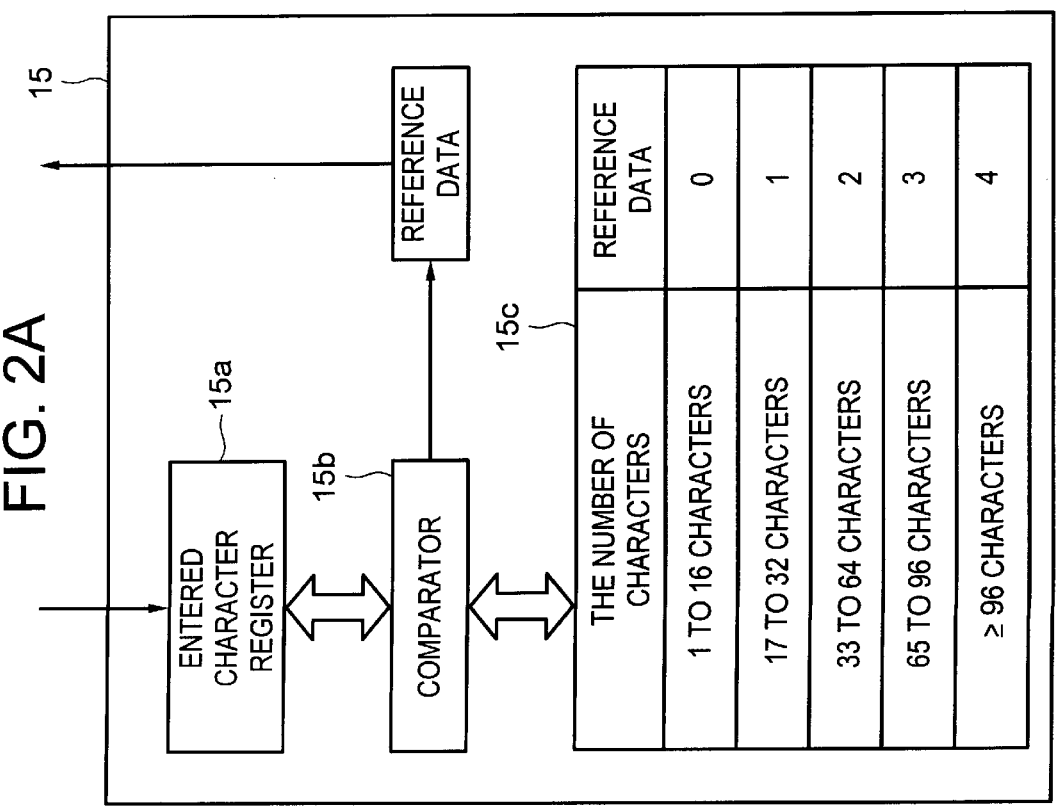

FIG. 2A is a block diagram showing in detail the configuration of the comparing unit 15 in the intelligent terminal device of the present invention shown in FIG. 1.

Operation of the comparing unit 15 shown in FIG. 2A will be described. When the data on the number of characters is input from the character number counter unit 14 to the comparing unit 15 as described above, the data is temporarily stored in a register 15a for input characters.

A comparator 15b stores reference data such as data 0, 1, 2, 3, 4 so on corresponding to 1 to 16 characters, 17 to 32 characters, 33 to 64 characters, 65 to 96 characters, not less than 96 characters so on, respectively, and compares the reference data with the data on the number of characters stored in said register 15a and to feed the reference data relevant to the font size such as 0 data to the CPU 4 as the result of comparison. The CPU 4 sends the reference data to a display control unit 7, which selects among fonts having predetermined sizes in a font storing unit 8a font having a size corresponding to each of reference data based upon the reference fusther, display control unit 7 a display 9 to display said characters and numeral using the selected font size.

Conditions in which font display is conducted is exemplary described. Various fonts having different sizes are stored in the font storing unit 8. Font A consists of 5×7 dots; font B consists of 7×10 dots; font C consists of 10×14 dots and a further font of 8×12 is also used. The screen of the display unit 9 may have 200×100 dots, or 32×64 dots.

FIGS. 3A and 3B show cases in which received message and the like is displayed with different fonts having different sizes in accordance with the above-identified operation. FIG. 3A shows a display in which the characters which are less in number (i.e. the amount of message is small) are displayed with larger font while FIG. 3B shows a display in that the characters which are larger in number (i.e. the amount of message is large) are displayed with smaller font. Transmitted information can be displayed on the screen with font having a size suitable for the number of characters.

In FIG. 1, a key pad 10 comprises various keys for entry or transmission of messages or commands. A reference numeral 10a denotes alphanumeric entry keys for entry of alphanumeric characters. When alphanumeric characters which constitute a message to be transmitted is entered by using these alphanumeric entry keys 10a, the input alphanumeric characters are fed to the CPU 4. Similarly to the information of foregoing received message, the number of characters of the message to be transmitted is also counted by a character number counting unit 14. A font having a size which is best matched with the screen size is selected depending upon the amount of the information. The message is displayed unit 9 on the display by using the selected font. At this time, the entered alphanumeric data are temporarily stored in the register unit 5.

The key pad 10 also comprises a transmission key 10b for transmitting a command to transmit alphanumeric data stored in the register unit. After a user confirms the content of the message which is currently displayed, the information comprising the alphanumeric characters which are stored in the register unit 5 in the above-mentioned operation are arranged in order by a data bit arranging unit 11 by the user depressing the transmission key 10b of the key pad 10 and is modulated by the modulating unit 12. Thereafter, a transmitted signal for carrying the information in interest is transmitted from the transmitting unit 13.

In the present embodiment, the size of font of the displayed information such as message and the like displayed on the screen can be changed by the user's actuation. In the arrangement of the device of FIG. 1, the message and the like to be transmitted/received can be displayed on the screen with font having a user's favorite size. The key pad 10 comprises an up and down keys 10c and 10d for selecting one step larger and smaller size font than the font which is currently used on the display 9, respectively, according to the user's choice. As mentioned in the embodiment, information of the received message and the like or message and the like which is entered for transmission is automatically displayed with font having a size most suitable for the display screen size.

When the user desires to change said font sizes by his or her choice, by depressing up key 10c, for example the CPU 4 confirms the currently displayed data in the register unit 5 and sends a command to the display control unit 7 to replace the currently used font with one step larger font. In response to the command, the display control unit 7 selects one step larger font from the fonts stored in the font storing unit to use the selected font in the display unit 9.

Alternatively, when the down key 10d is depressed, a font which is smaller by one step than the size of the currently used font is selected in response to the command and display is conducted by using the selected font.

When a message and the like to be transmitted is entered by depressing alphanumeric entry key 10a of the key pad 10 on transmission of the message, the message and the like is automatically displayed on the display unit 9 with font having a size suitable for the amount of the information of the message and the like, in a manner as mentioned above. When it is determined that transmission be preferably conducted after confirming the message and the like with font having a size which is larger by one step in view of the importance of the message and the like, the up key 10c is depressed so that the currently used font can be replaced with fount having a size which is larger by one step.

In such a manner, the user can conduct transmission of message and the like by selecting font having a favorite size so that the content of the message can be confirmed on a screen in the most visible manner for the user. A third embodiment is embodied as optional means for the device shown in FIG. 1. The embodiment includes means for indicating characteristic information having important meaning in a message and the like. If consecutive numerals are contained in the transmitted/received message in this case, these numerals may be often important information such as telephone number or personal identification number. Accordingly, the consecutive numerals are preferably displayed by using special font.

In FIG. 1, the signal carrying information such as a message and the like which is input via the signal line is received and is then demodulated into a baseband signal by the demodulating unit 2 and is detected as a digital signal representing characteristic characters or numerals by the data detecting unit 3. The digital signal representative of the characters or numerals is temporarily fed to a consecutive numeral detecting unit 16, in which it is compared with the preliminarily registered digital signals of characters and special symbols. If the digital signal is detected as consecutive numerals, the consecutive numeral detecting unit 16 sends the result to the CPU 4.

FIG. 2B is a block diagram showing in more detail the configuration of the consecutive numeral detecting unit 16 in the intelligent terminal device of the present invention shown in FIG. 1. When a digital signal which constitutes a message is input to the consecutive numeral detecting unit 16, it is stored in the input data register 16a. The consecutive numeral detecting unit 16 comprises a numeral/special symbol data storing unit 16b which converts numerals and special symbols such as colon, comma etc, into digital form preliminarily storing them and a comparing unit 16c which compares the digital signals in the entered data register 16a with digital signals in the numeral/special symbol data storing unit 16b. If comparison of these signals detects that the digital signals are consecutive, the signal is stored in the consecutive numeral data register 16d and then the consecutive numeral detecting unit 16 sends the result to the CPU 4. The CPU 4 temporarily stores the consecutive digital signals in the register unit 5 and further sends the consecutive numeral data in the register unit 5 to the display control unit 7, which selects special font from those in the font storing unit 8 to change the display from positive to negative display or characters from fine characters to larger or bold characters so that only consecutive numerals is displayed on the display unit 9 together with the message and the like by using special font.

Also in the case in which a message to be is entered by means of the alphanumeric entry key 10a of the key pad 10, when numerals are consecutively entered, the CPU 4 confirms that they are consecutive numerals by the consecutive numeral detecting unit 16. The CPU 4 temporarily stores the entered message and the like in the register 5 and sends a relevant data to the display control unit 7. At this time, the CPU 4 instructs the display control unit 7 to display the consecutive numeral data with special font. The display control unit 7 selects font from the font storing unit 8 in accordance with a command and displays the consecutive numerals using selected font together with transmitted message.

FIG. 3C shows a case in which consecutive numerals are displayed in such a manner.

A fourth embodiment is arranged to edit and to display only numerals on a screen when it is detected that consecutive numerals are contained in the received message, similarly to the third embodiment.

When a signal for carrying message and the like which is input via the signal line is received by the receiving unit 1, the signal is demodulated into a baseband signal by the demodulating unit 2 and is detected by the data detecting unit 3 and is temporarily stored in the register 5. The CPU 4 sends the data to the display control unit 7, which selects font from the font storing unit 8 in accordance with the data and displays on the display unit 9 using the selected font.

An editing key 10e of the key pad 10 is adapted to generate a command so that data on only consecutive numerals which are selected from the data stored in said register unit 5 is fed to the display control unit 7 and consecutive numerals are displayed on the display unit 9 by using the font selected from those stored in the font storing unit 8.

When the editing key 10e of the key pad 10 is depressed, the CPU 4 sends data on only consecutive numerals from data stored in the register unit 5 and the display control unit 7 selects a font from the font storing unit 8 in accordance with the command to cause the display unit 9 to display the consecutive numerals. This enables only consecutive numerals to be edited and displayed on the screen again.

FIG. 3D shows a case in which only consecutive numerals including symbols of the message are displayed in such a manner.

In accordance with the intelligent terminal device, transmitted information or information which is processed by an intelligent terminal device in response to a command can be displayed on a display screen by using a font having a size which is best matched with the size of the screen. Since data on font sized which are selected depending upon the amount of said transmitted information are stored as reference data, there is the advantage of shortening of the period of time which is taken to count the number of characters and to change font sizes can be achieved in comparison to that in the prior art device.

Additionally accordance with the intelligent terminal device, since information which is processed by said intelligent terminal such as received or transmitted message and the like can be displayed on a display screen by using a font having a size which the user likes best, they are most visible on the screen. This is advantageous in that it will contribute to avoidance of erroneous transmission of a message and the like.

Further accordance with the intelligent terminal device, since information which is processed by said intelligent terminal device is displayed on a display screen by using a special font, identification between character and numeral is easy and display of information such as message and the like containing numeral may have a high visibility. This is advantageous in that it will contribute to avoidance of erroneous transmission of message and the like.

Moreover, in accordance with the intelligent terminal device, display of only characteristic information represented by consecutive numerals including symbols, which is important information of the information to be processed by said intelligent terminal device provides a high visibility.

What is claimed is:

1. An intelligent terminal device for displaying transmitted information, comprising:

a transmitter/receiver portion for transmitting/receiving transmitted signals;

an input portion for entering information such as messages and/or commands;

a display portion for displaying information in signals transmitted/received by said transmitter/receiver portion, and information entered by said input portion;

a measure portion for measuring the amount of the information of the transmitted signals and of the information entered by the input portion as a number of characters and/or symbols;

a font-store portion for storing fonts of different sizes; and a comparing means for holding, as reference data, data on the size of the font to be selected with respect to the amount of information represented by said symbols and/or characters, wherein said measure portion measures the amount of the information to be displayed on the display portion simultaneously with said comparison means comparing said measured amount with the reference data, and wherein font size data is automatically selected by the result of the comparison, the font having a size which is specified from the font-store portion specifying the selected front size data being selected in accordance with said comparison result.

2. The device of claim 1, wherein said font size data can be changed in response to a command input from said input portion.

3. The device of claim 1 or 2, further comprising:

a detector portion for detecting characteristic information that is specified by consecutive numerals and including symbols contained in data transmitted/received by said transmitter/receiver portion, and in information input by said input portion, wherein fonts representative of said characteristic information are stored in said font-store portion as special fonts, and wherein said special font is selected in accordance with a detection result, to be used for display.

4. The device of claim 1 or 2, further comprising:

a detector portion for detecting characteristic information that is specified by consecutive numerals and including symbols contained in data transmitted/received by said transmitter/receiver portion and in information input by said input portion, wherein only detected characteristic information and detected information that is entered by said input portion is displayed in response to a command from said input portion.

5. The device of claim 3 further comprising:

a detector portion for detecting characteristic information specified by consecutive numerals and including symbols contained in data transmitted/received by said transmitter/receiver portion and information input by said input portion, wherein only detected characteristic information and detected information that is entered by said input portion is displayed in response to a command from said input portion.

6. An intelligent terminal for displaying information, comprising:

comparison means for comparing a number of counted characters of an input digital signal with a plurality of stored count values to obtain a reference value, wherein said digital signal represents characters and/or symbols of a message, and wherein said character count is performed simultaneously with said comparison, and a font-storing unit for automatically selecting a font size corresponding to said reference data, thereby displaying a font size appropriate for the length of said message.

7. The device of claim 6, wherein each of said plurality of stored count values correspond to character length of said message and have a corresponding reference value associated therewith.

8. The device of claim 6, wherein said reference data is dependent on character length and is determinative of the character font-size for displaying said message.

9. The device of claim 6, wherein a desired font size for display of the message may be selected by the user.

10. The device of claim 6, further comprising a detector for detecting important characters within said message, wherein said important characters are to be displayed in a font different from the other characters and/or symbols in the message.

11. The device of claim 10, wherein said detector compares said input digital signal with pre-stored signals representing characters and/or symbols, said detector outputting a detection result signifying important characters when it detects consecutive numerals in said message.

12. The device of claim 9 or 11, wherein a user can control the displaying of only desired characters and/or important characters of a message.

13. The device of claim 12, wherein said control is achieved by using an inputted having an edit function.

14. An intelligent terminal for displaying information, comprising:

a detector for detecting important characters of a message which is input as a digital signal, wherein said digital signal represents characters and/or symbols of a message, and wherein said detector compares the characters and/or symbols of the digital signal with pre-stored signals representing characters and/or symbols, said detector outputting a detection result signifying important characters when it detects consecutive numerals in said message; and a font-storing unit for automatically selecting font characteristic for said important characters of said message in accordance with said detection result.

15. The device of claim 14, wherein said font characteristics are the font style for display of said important characters on a screen of the device.

16. The device of claim 14, wherein said font characteristics are the font size for display of said important characters on a screen of the device.

17. The device of claim 14, wherein a user can control the displaying of said important characters of said message.

18. The device of claim 17, wherein said control is achieved by using an inputter having an edit function.

19. A method of displaying characters and/or symbols of a message on an intelligent terminal device, comprising:

comparing a number of counted characters of an input digital signal representing said characters and/or symbols of said message with a plurality of stored count values to obtain a reference value, wherein said character count is performed simultaneously with said comparison, and automatically selecting a font size corresponding to said reference data, thereby displaying a font size appropriate for the length of said message.

20. The method of claim 19, wherein said reference data is dependent on character length of said message and is determinative of the character font-size for displaying said message.

21. The method of claim 19, further comprising detecting important characters within said message, wherein said important characters are to be displayed in a font different from the other characters and/or symbols in the message.

22. The method of claim 21, wherein said step of detecting further includes comparing said input digital signal with pre-stored signals representing characters and/or symbols, said detector outputting a detection result signifying important characters when it detects consecutive numerals in said message.

* * * * *